United States Patent [19]

Kihara

[11] Patent Number: 4,797,812

[45] Date of Patent: Jan. 10, 1989

[54] SYSTEM FOR CONTINUOUS DMA TRANSFER OF VIRTUALLY ADDRESSED DATA BLOCKS

[75] Inventor: Jyunichi Kihara, Tokyo, Japan

[73] Assignee: Kabushiki Kaisha Toshiba, Kawasaki, Japan

[21] Appl. No.: 874,995

[22] Filed: Jun. 16, 1986

[30] Foreign Application Priority Data

Jun. 19, 1985 [JP] Japan .................................. 60-133401
Jun. 19, 1985 [JP] Japan .................................. 60-133402
Jun. 19, 1985 [JP] Japan .................................. 60-133403

[51] Int. Cl.⁴ ...................... G06F 12/08; G06F 13/00
[52] U.S. Cl. .................................................. 364/200
[58] Field of Search ... 364/200 MS File, 900 MS File

[56] References Cited

U.S. PATENT DOCUMENTS 4,173,783 11/1979 Couleur et al. .................... 364/200
4,430,701 2/1984 Christian et al. .................. 364/200
4,488,228 12/1984 Crudele et al. ..................... 364/200

*Primary Examiner*—David Y. Eng
*Assistant Examiner*—Florin Munteanu
*Attorney, Agent, or Firm*—Finnegan, Henderson, Farabow, Garrett, & Dunner

[57] ABSTRACT

A channel apparatus including a transfer controller responsive to an input data transfer command, for translating virtual block address data designated by a channel command word (CCW) into RBA data to store the translated RBA data. The CCW commands the DMA transfer of the data over a plurality of subsequent blocks of the external memory. The translated RBA data are written in a real address storage section in a write mode. The controller outputs a transfer start instruction to a DMA transfer section after outputting an initial value of a DMA address to a DMA transfer section and writing a predetermined amount of the RBA data to the storage section. The DMA transfer section performs the DMA transfer of the data to the external memory in a read mode in accordance with the transfer start instruction while the data is being input from the external device. The transfer section generates a memory request every time performing the DMA transfer of one word of the data. At the same time, the transfer section outputs the DMA address to the storage section. In the storage section, a real address is produced in combination with the offset data in the DMA address and the stored RBA data at the read storage address in the DMA address to output the produced address to the external memory in response to the memory request.

26 Claims, 12 Drawing Sheets

SYSTEM FOR CONTINUOUS DMA TRANSFER OF VIRTUALLY ADDRESSED DATA BLOCKS

BACKGROUND OF THE INVENTION

This invention relates to a computer system using virtual memory area, and more particularly to a channel apparatus capable of continuing the data transfer between an input/output device and a main memory even when the block address is changed.

This type of channel apparatus is usually used for the data transfer control between a main memory and a high speed memory device, such as a magnetic disc drive coupled with the channel apparatus. A virtual address used is translated into a real address referring to an address translation table in the main memory. The address translation is generally executed by a microcomputer in the channel device. This translating operation is called a channel DAT (dynamic address translation).

In the conventional channel device, the address translation, writing of the translated real address, or the transfer preparation must be executed by the microcomputer in the channel device every time a block address, for example, a page address is changed. For this reason, the impossibility of data transfer change was a problem every time the page address is changed.

Further, in the conventional channel device, when a channel command word (CCW) with a skip command is executed, a track for restart of the data transfer must be sought in order to execute the next CCW following the execution of the CCW with the skip command. To this end, the microcomputer generates a seek command. However, even though data transfer in response to the seek command is attempted, at the time point of the CCW execution, its intended sector passes over the head of the magnetic disc, and the data cannot be transferred until the disk make one complete rotation. Thus, the problem of reduced throughput was present.

SUMMARY OF THE INVENTION

Accordingly, an object of this invention is to provide a method of effectively performing a DMA transfer of data input from an external device to an external memory and a channel apparatus for realizing the method.

To achieve the above object, there is provided a channel apparatus that includes a transfer controller responsive to an input data transfer command, for translating virtual block address data designated by a channel command word (CCW) into real block address (RBA) data to store the translated RBA data. The CCW commands the direct memory access (DMA) transfer of the data over a plurality of subsequent blocks of the external memory. The translated RBA data are written in a real address storage section in the write mode. The controller outputs a transfer start instruction to a DMA transfer section after outputting an initial value of a DMA address to a DMA transfer section and writing a predetermined number of the RBA data to the storage section. The DMA transfer section performs the DMA transfer of the data to the external memory in a read mode in accordance with the transfer start instruction while the data is being input from the external device. The transfer section generates a memory request every time the DMA transfer of one word of the data is performed. At the same time, the transfer section outputs the DMA address to the storage section. In the storage section, a real address is produced in combination with the offset data in the DMA address and the stored RBA data at the read storage address in the DMA address to output the produced address to the external memory in response to the memory request.

To achieve another object, there is provided the method comprising translating each virtual block address data of a plurality of CCWs into RBA data in response to a data transfer command to hold the translated RBA data, latching an initial value of a DMA address including an offset data and a real storage address for the RBA data, sequentially writing a predetermined number of the held RBA data in a dynamic address translation RAM (DAT-RAM) in a write mode, performing the DMA transfer of the data to the external memory in accordance with a transfer start instruction in a read mode while the data is being input from an external device. A memory request is generated each time the DMA transfer of one word of the data is performed and is output to the external memory. At the same time, the DMA address is output and then is incremented by one. The method further comprises combining the RBA data read out from the DAT-RAM in accordance with the read storage address in the DMA address and the offset data in the DMA address to output the combined data to the external memory in accordance with the memory request.

According to this invention, even when the data transfer covers several pages, if the data transfer uses a continuous memory area, protect against the impossibility of data transfer at each time a page address change is occurred. Additionally, the stored page address is checked so that during its process, erroneous data transfer never occurs. In executing CCW with the skip command in a channel program, the skip operation is properly performed without any interruption of data transfer. With this feature, the waiting time of the rotational delay of the magnetic disc can be prevented from occurring, and the throughout can be improved.

DETAILED DESCRIPTION OF THE PREFERRED EMBODIMENTS

A channel apparatus according to this invention will be described in detail, with reference to the accompanying drawings.

Figure 1:
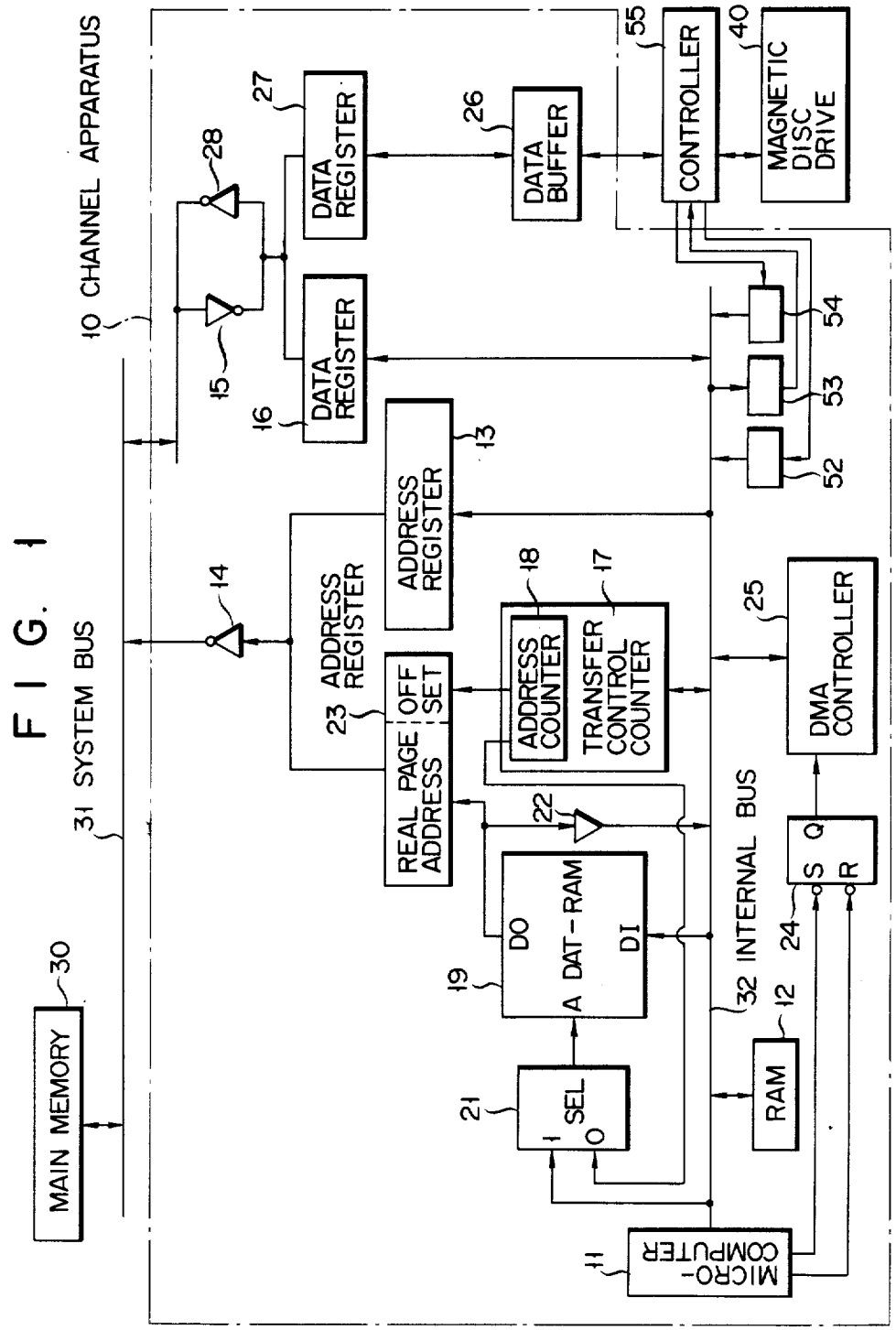
FIG. 1 is a block diagram showing an arrangement of an embodiment of a channel apparatus according to this invention.

An arrangement of an embodiment of a channel apparatus, which can transfer data using virtual block address, for example, virtual page address, according to this invention will be described with reference to FIG. 1. The embodiment includes microcomputer (hereinafter referred to as CPU) 11, which transfers data through internal bus 32. A ROM (not shown) is connected to CPU 11. Various kinds of microprograms are stored in this ROM. CPU 11 controls the overall channel apparatus based on these programs. RAM 12 is connected to internal bus 32, and stores data necessary for processing.

Dynamic address translation RAM (DAY-RAM) 19 has address port A, data input port DI, data output port DO, and a memory area in which, for example, up to 8 real page addresses can be stored. Input port DI of DAT-RAM 19 is connected to internal bus 32. In an address data write mode, which is set in response to a mode control command, DAT-RAM 19 receives real page address data output from 4CPU 11, via internal bus 32, and stores the real page address data at a location specified by a DAT-RAM address data or a storage address data output from selector 21. In an address data read mode, DAT-RAM 19 outputs from output port DO real page address data from a location specified by the storage address input to address port A.

Transfer control counter 17 is also connected to internal bus 32, and performs input/output operation of data through bus 32. Transfer control counter 17 comprises address counter 18, and a size counter not shown in the drawing. In the embodiment, address counter 18 is a 14-bit counter. An offset data of the real page address data is stored in the lower 11-bit part of counter 18. The storage address data for DAT-RAM 19 is stored in the upper 3-bit part. This offset data is updated so that it is incremented by 1 every time one word of data is transferred. As a result, when a carry occurs, viz. when a page change occurs, transfer control counter 17 generates a page change interrupt for CPU 11. A total amount of words of data concerning a series of data transfer operation to be continuously performed, for example, data size specified by the first CCW, is written into the size counter by CPU 11.

One input, or "1" side, of selector 21 is connected to internal bus 32, and the other input, or "0" side, is connected to counter 18. Selector 21, selectively input either DAT-RAM address data from counter 18 or DAT-RAM address output from CPU 11 via internal bus 12, in response to the selector control signal from CPU 11, and outputs selected one to address port A of DAT-RAM 19.

Address register 23 is a 32-bit register in this embodiment. In address register 23, the upper 21-bit part is connected to output port DO of DAT-RAM 19, and the lower 11-bit part is connected to the lower 11-bit part of address counter 18 in transfer control counter 17. In address register 23, the real page address data from DAT-RAM 19 are written into the upper 21-bit part. The offset data from address counter 18 in transfer control counter 17 is written into the lower 11-bit part. The real page address data latched in address register 23 is then output as real addresses used in a data transfer in response to a memory request command. Gate 22 is connected between the output port of DAT-RAM 19 and internal bus 32, and in response to the instructions from CPU 11, outputs the data from DAT-RAM 19 to internal bus 32.

Address register 13 is connected to internal bus 32, and in response to instructions from CPU 11, fetches address data from internal bus 32. The input of driver 14 is connected to address registers 13 and 23, and the output is connected to system bus 31. In response to instructions from CPU 11 or DMA controller 25, driver 14 outputs the address data output from address register 13 or 23 to the main memory 30 via system bus 31.

Data register 16 transfers data between internal bus 32, and receiver 15 and driver 28. Data register 27 transfers data between data buffer 26, and receiver 15 and driver 28. An input of receiver 15 and an output of driver 28 are connected to system bus 31. In response to instruction from CPU 11, data register 16 latches data read out from main memory 30 through receiver 15 and bus 31, and outputs the readout data to internal bus 32, and receives data on bus 32 which is output to system bus 31 through driver 28. Also, in response to instructions from DMA controller 25, egister 27 latches data read out from main memory 30 through system bus 31 and receiver 15, and outputs it to buffer 26, and transfers data from buffer 26 to system bus 31 through driver 28.

Flip/flop 24, hereinafter called "transfer permission F/F", is also connected to CPU 11. Transfer permission F/F 24, according to instructions from CPU 11, is either set or reset, and the result is output to DMA controller 25. When F/F 24 is in the set state, DMA controller 25 performs the control for DMA data transfer between data buffer 26 and main memory 30. When the transfer operation ends, DMA controller 25 generates a transfer completion interrupt for CPU 11.

Data buffer 26 is connected to data register 27 and controller 55 for controlling magnetic disc drive 40. The output of data register 27 is connected to the output of driver 15 and to the input of driver 28. Ports 52 to 54 are connected between internal bus 32 and controller 55. When a seek operation ends, port 52 provides the seek completion interrupt from controller 55 to CPU 11, and port 54 outputs the status of controller 55 to CPU 11 through internal bus 32. Port 53 receives an access command including a seek instruction from CPU 11 via internal bus 32, and outputs it to controller 55. In response to instructions from DMA controller 55, in data read mode, data is transferred to/from main memory 30, via data buffer 26, data register 27, driver 28, and system bus 31.

Figure 4:
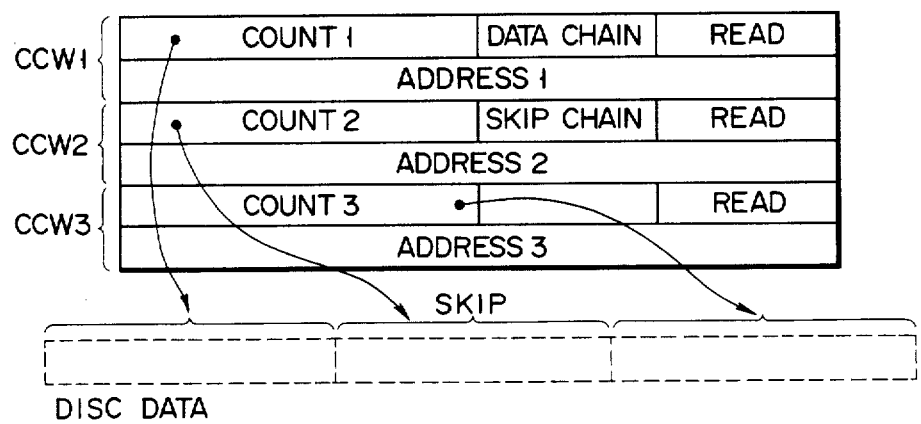
FIG. 4 shows a group of CCWs.
Figure 6A:
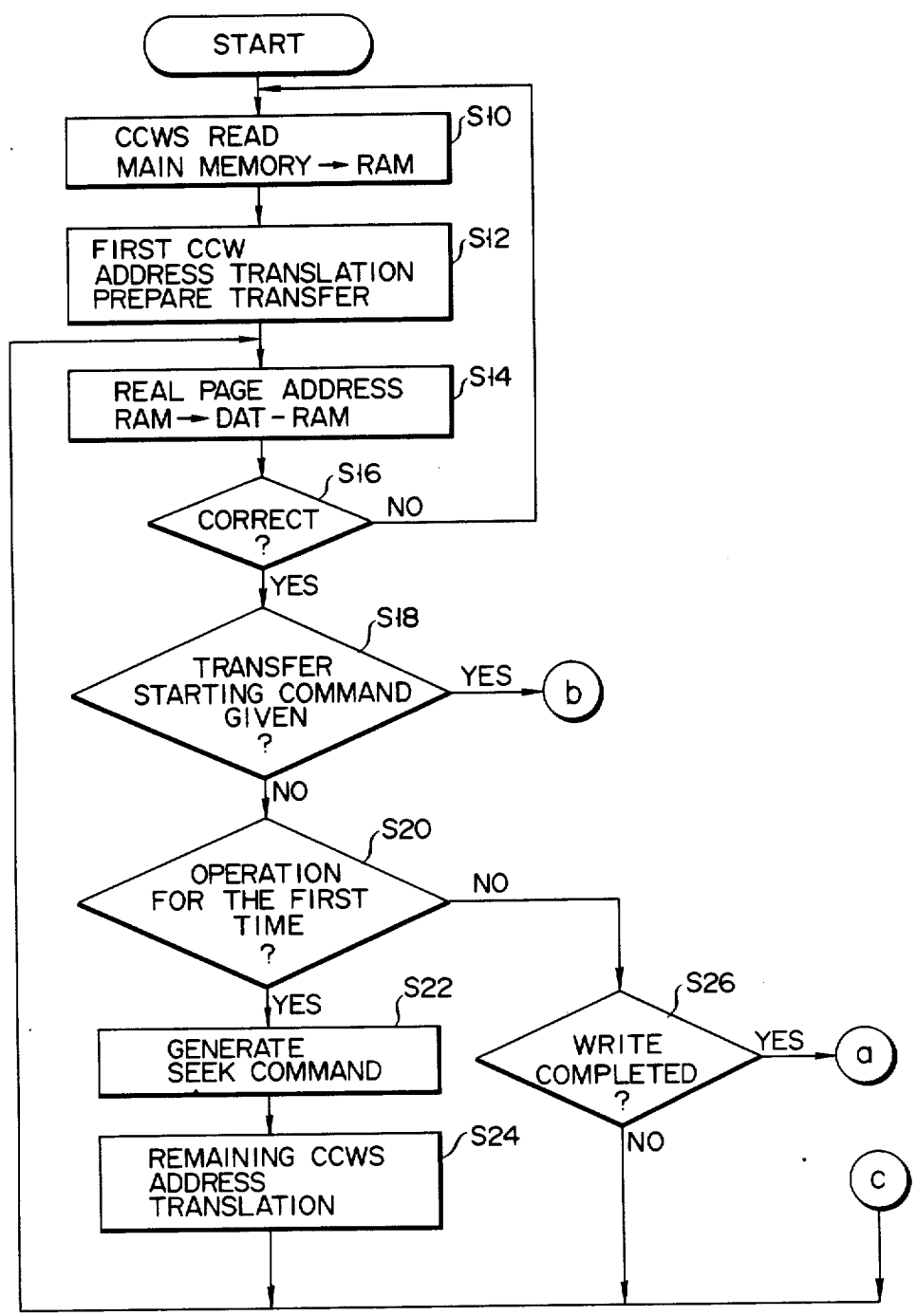
FIGS. 6A and 6B show a flowchart for explaining the operation of the embodiment in FIG. 1.

The operation of the channel apparatus according to the embodiment of this invention will be described with reference to FIGS. 6A and 6B. If a data transfer instruction is generated from the main CPU (not shown), CPU 11 reads out a channel program from main memory 30. More specifically, CPU 11, in step S10, responds to the data transfer instruction and starts the operation for reading the channel program into RAM 12 from main memory 30. The channel program comprises at least one channel command word (CCW), for example, a channel command word group as shown in FIG. 4. Main CPU outputs, together with the data transfer instruction, leading real address data of the memory area of channel program in main memory 30 to data register 16. CPU 11 receives the leading address data from register 16 and outputs it to address register 13. Then, CPU 11 generates a program read command. The leading real address of the channel program, in response to the program read command, is output from address register 13, and is supplied to main memory 30 via driver 14 and system bus 31. Main memory 30 outputs the CCW stored in the memory location of this address, via system bus 31 and receiver 15, to data register 16. The read out CCW is fetched by CPU 11, and is stored in RAM 12, every time read out. CPU 11 updates the real address for the next CCW read out, and repeats the process as described above. In this way, CPU 11 reads out all the CCWs from main memory 30.

Figure 5:
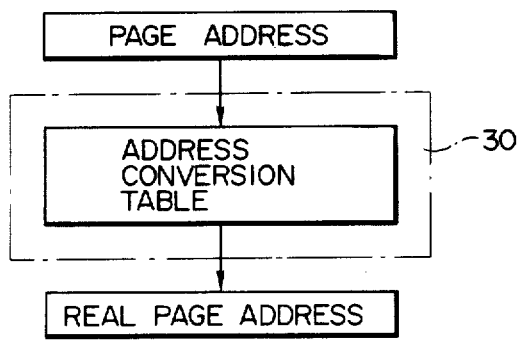
FIG. 5 shows a diagram showing an address translation.

In step S12, CPU 11, as shown in FIG. 5, translates to a real page address data a virtual page address data in an address data field of CCW read out first, and prepares for the data transfer.

Figure 2:
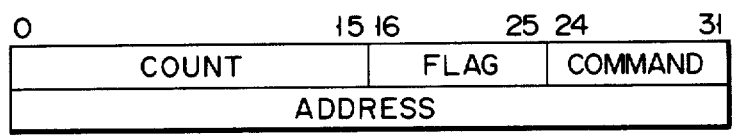
FIG. 2 shows a format of a channel command word (CCW) used in the channel apparatus of FIG. 1.

The data format of the read out CCW is shown in FIG. 2. The CCW includes a 16-bit count field, an 8-bit flag field, an 8-bit command field, and the 32-bit address data field. The command field is used for designating seek, read, and write operation commands. The flag field is used to designate the command chain, data chain, and skip chain corresponding to bit representations. The address data field contains the leading virtual page address in the memory area to be accessed by the command specified in the command field. The count field indicates the data size to be accessed through the command. The address data field is made up of the 21-bit virtual page address data field and the 11-bit offset data field, as shown in FIG. 3.

Figure 13:
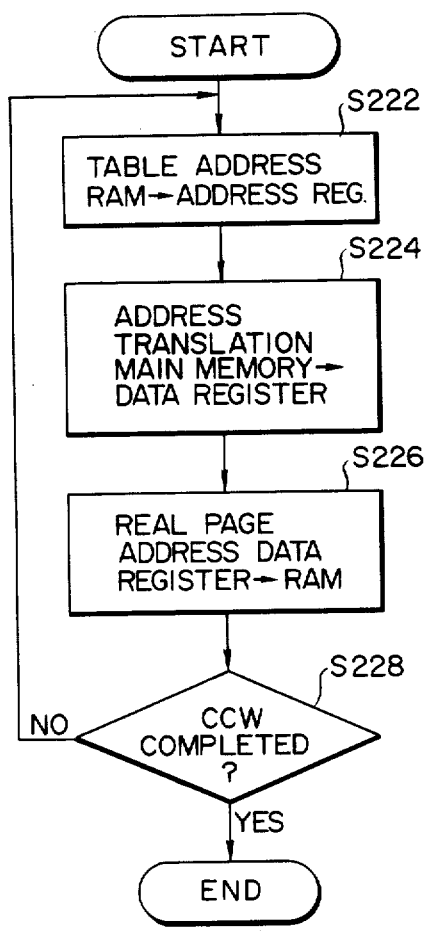
FIGS. 13 and 14 show flowcharts illustrating an address translation processing in the embodiments shown in FIGS. 1 and 12 respectively.

The details of the address translation operation of this embodiment are shown in FIG. 13. In step S222, CPU 11 sets address data corresponding to the virtual page address data in the first read out CCW to address register 13 in order to access a translation table. The address data is output from address register 13 to main memory 30 in response to the address translation command from CPU 11. In step S224, main memory 30 outputs translated real page address data via receiver 15 to data register 16. Then, in step S226, CPU 11 fetches the real page address data from data register 16, and stores it into RAM 12. In step S228, it is checked whether a command of the first readout CCW concerns the data transfer of less than 2 page area, or of more than 2 page area. If Y in step S228, the address translation operation is ended. If N, step S222 is executed again to translate another virtual page address data.

Figure 3:
FIG. 3 shows a format illustrating an address data field of the CCW shown in FIG. 2.

In order to prepare the data transfer, CPU 11 reads out from the address data field of the first read out CCW a predetermined length data, for example, the lower 11-bit part corresponding to the offset data field in the address data field shown in FIG. 3. Then, CPU 11 sets the offset data, together with data to cause the upper 3-bit part of address counter 18 to be "0", into address counter 18 of transfer control counter 17. Then, CPU 11 sets the count of the data size specified in the count field of the first readout CCW into the size counter of transfer control counter 17.

CPU 11 resets the internal area of RAM 12 where various types of data necessary for the data transfer operation are stored, such as the number of real page address data already stored in DAT-RAM 19, the number of error determination, and the like.

Subsequently, in step S14, a write operation of the leading real page address of the first CCW into DAT-RAM 19 is executed. Selector 21, in response to a select control command output from CPU 11, enables the input terminal to the CPU 11 side. CPU 11 sets DAT-RAM 19 to the address data write mode, and outputs DAT-RAM address to selector 21. In this case, the DAT-RAM address is 3-bit "0" data.

CPU 11 outputs the translated leading real page address for first CCW to DAT-RAM 19. The leading real page address is stored into the memory location of the DAT-RAM address output from selector 21, i.e. the address "0". The number of write operations is incremented by 1. The number of write operations is reset in step S12, so the number of write operations is 1 now.

Figure 8:
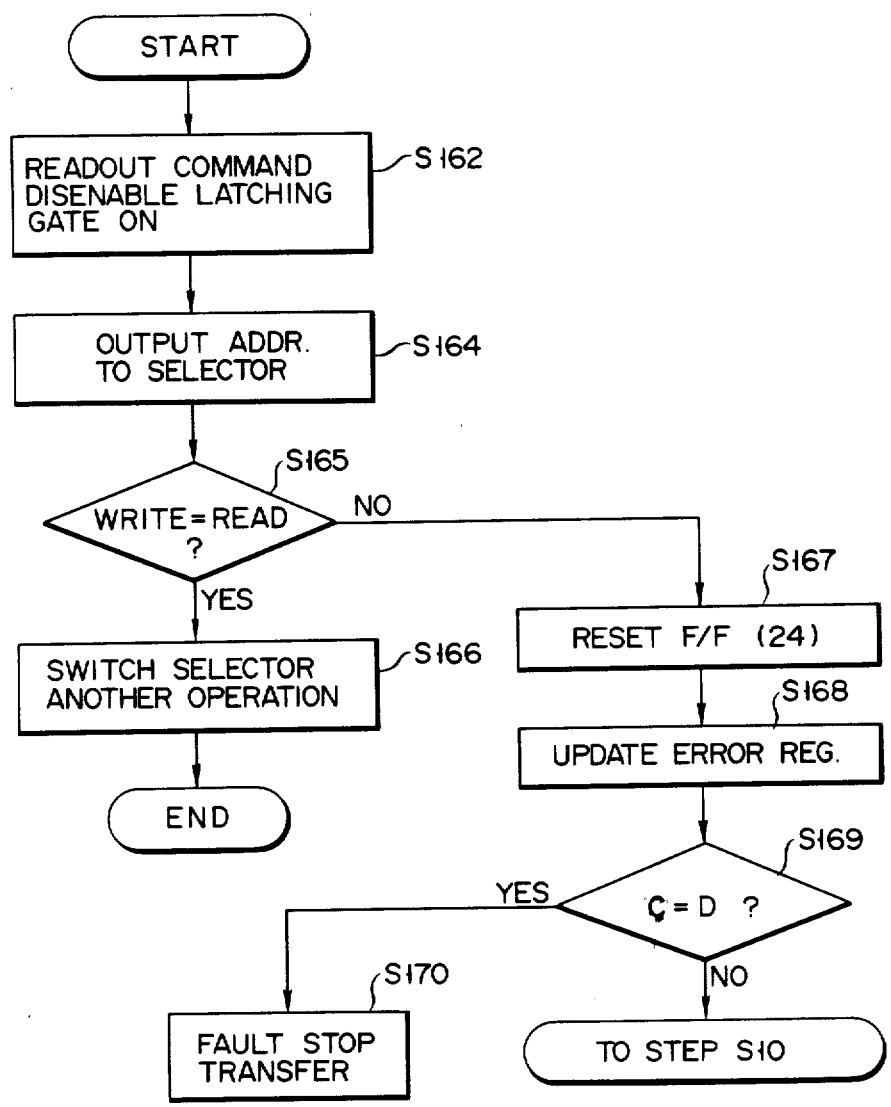
FIG. 8 shows a flowchart for explaining the details of the operation for checking the real block address written into DAT-RAM, in the flowchart shown in FIG. 6A.

In step S16, it is checked if the write operation to DAT-RAM 19 has been made normally or not. The details of this determination process are shown in FIG. 8. At this time, selector 21 remains in enabling "1" side. The DAT-RAM address remains in the address data write mode in step S14, in this case, it is "0".

In step S162, CPU 11 generates a mode control command, and sets DAT-RAM 19 in the address data read mode. Also, CPU 11 generates a control signal to inhibit the latching operation of address register 23, and to enable gate 22. In step S164, CPU 11 outputs the same DAT-RAM address as used in step S14 to selector 21. As a result, DAT-RAM 19 outputs the real page address written into the DAT-RAM address in step S14, and CPU 11 receives it via gate 22 and internal bus 32. In step S165, CPU 11 determines whether or not the real page address written into DAT-RAM 19 in step S14 is equal to the real page address read out in step S164. If Y in step S165, step S166 is executed.

In step S166, the DAT-RAM address is updated to increment by 1. In this case, the DAT-RAM address is "1", and the number of error determinations C is reset. CPU 11 outputs the selector control command, and enables an input terminal of the "0" side in selector 21. DAT-RAM 19 remains in the address data read mode.

If N in Step S165, step S167 is executed, CPU 11 resets transfer permission F/F 24. In step S168, CPU 11 updates the number of error determinations C, to increment by 1. In step S169, CPU 11 determines if the number of error determinations C is equal to a predetermined value D. If N in step 169, step S10 is executed again to write the real page address into DAT-RAM 19. If Y in step S169, step S170 is executed, and the data transfer is stopped for the reason that a fault occurred in the channel apparatus. If N in step S169, it was stated that step S10 is executed, but if the channel program is left in RAM 12, the flow may return to step S12, or if the translated address remains, step S14 may be executed.

As described above, according to this invention, since the channel apparatus verifies write operation of the real page address, main memory 30 can be protected against the destruction of data stored in its memory area, due to the data transfer using an erroneous real page address.

After verifying that a correct write operation has been executed in step S16, step S18 is executed. In this step, it is determined if a transfer starting command is given, in other words, if the data transfer has already been started, in accordance with the channel program. If Y in step S18, step S34 is executed, and if N, step S20 is executed. In step S20, it is determined if the write operation of the real page address to DAT-RAM 19 is for the first time or not. Since the number of the write operation at this time is "1", step S22 is executed. In step S22, a seek command corresponding to the first CCW is generated from CPU 11 to controller 55 via port 53. Then, in response to the seek command, magnetic disc drive 40 starts a seek operation.

As is well known, the seek operation is accompanied by a mechanical operation, and it takes a relatively long time. In step S24, while magnetic disc drive 40 is executing the seek operation, CPU 11 repeatedly executes the address translation for all CCWs in the channel program except for the first CCW already translated in step S12. The address translation operation for each CCW is the same as the operation explained in step S12.

In order to write the translated real page address data into DAT-RAM 19, steps S14 through S18 are executed. The input terminal of selector 21 is switched to the "1" side by the selector control command from CPU 11, and DAT-RAM 19 is designated to be in the address data write mode. Since the DAT-RAM address corresponding to the second real page address data is, by means of incrementing by 1, "1", and it is output to selector 21, the second real page address is written into DAT-RAM 19 at DAT-RAM address "1". Subsequently, in this manner, for write operation of the real page address, the DAT-RAM address is incremented one by one. The number of times of the write operation is also incremented by 1.

Step S20 is then executed, but the number of times of the write operation is no longer "1", so that the determination is N, and step S26 is executed. CPU 11 determines if a series of write operations of the real page address has been completed, in other words, if DAT-RAM 19 is full or not. If not, it is determined if the real page address not yet written still remains in the RAM 12. If DAT-RAM 19 is full or if it is not full and the not yet written real page address is no longer there, the CPU determines that a series of write operation has been completed, and executes step S28. When DAT-RAM 19 is not full, and the not yet written real page address remains in RAM 12, CPU 11 executes steps S14 through S20, to perform the write operation of the real page address data again. In this embodiment, DAT-RAM 19 has a storage capacity capable of storing a maximum of eight real page addresses. Therefore, if more than 8 real page addresses have been translated, these steps are repeated until DAT-RAM 19 becomes full.

When the write operation into DAT-RAM 19 is completed, CPU 11, in step S28, determines if the seek operation of magnetic disc drive 40 has been completed or not. This is determined by awaiting the seek completion interrupt generated by controller 55 via port 52. When the seek operation ends, step S30 is executed.

In step S30, CPU 11 generates the data transfer starting command, and at the same time, prepares for data transfer. Then, step S34 is executed.

Figure 15:
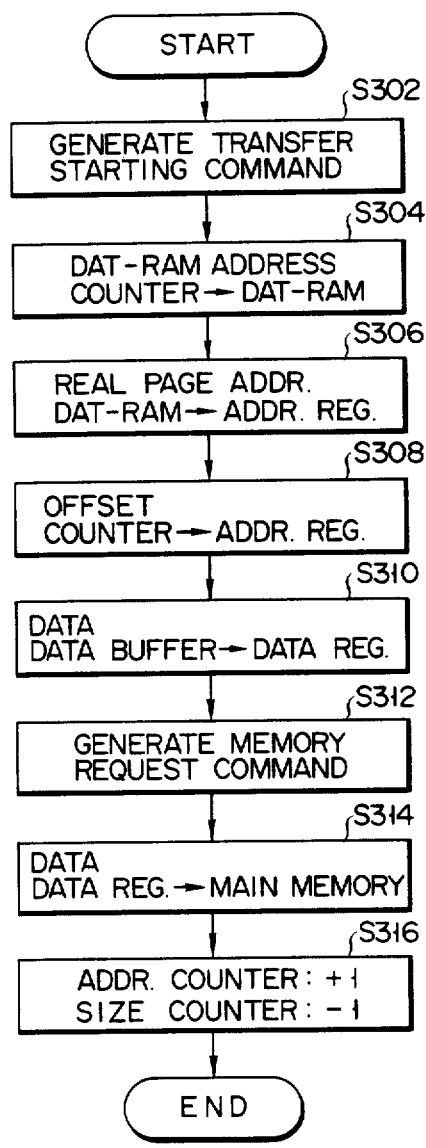
FIGS. 15 and 16 show flowcharts illustrating the writing operation of a real address into DAT-RAM in the embodiments shown in FIGS. 1 and 12 respectively.

The details of the operation relating to the data transfer after step S30 are shown in FIG. 15. In step S302, CPU 11 outputs the selector control command to enable the input terminal, in selector 21, of the "0" side, or of the transfer control counter 17 side. Then it permits the latch operation of address register 23, and disables gate 22. Subsequently, CPU 11 generates the transfer starting command to transfer permission F/F 24. Then, transfer permission F/F 24 is set, and DMA controller 25, in response to the output of transfer permission F/F 24, begins the control of the DMA data transfer between the data buffers 26 in channel apparatus 10 and main memory 30.

CPU 11 outputs an access command corresponding to the command in the command field of the CCW to be executed, to controller 55 via port 53. For example, when the first CCW to be executed relates to the transfer of data read-in from magnetic disc drive 40, controller 55 reads out the data from magnetic disc drive 40, and outputs this data to data buffer 26. When data exceeding a specified size is transfer into data buffer 26, DMA controller 25 reads out the data from data buffer 26 and transfers it between main memory 30 and buffer 26. In step S304, the address counter 18 in transfer control counter 17, in response to the memory request command from DMA controller 25, outputs its contents. In step S306, the upper 3-bit part of the contents an DAT-RAM address are output to DAT-RAM 19. The real page address read out of DAT-RAM 19 is latched in the upper 21-bit part of address register 23. As seen from step S308, the lower 11-bit part of address counter 18 are output as the offset to address register 23. With this, the real address for main memory 30 has been set in address register 23.

The data, which has been read out of magnetic disc drive 40 and stored into data buffer 26, is read out and latched into data register 27 by the memory request command from DMA controller 25. In step S312 in response to the memory request signal from DMA controller 25, the real address and data are output, and the data is written into the memory location of main memory 30 designated by the real address in step S314. At this stage, the data of one word has been transferred to main memory 30.

Subsequently, DMA controller 25, in step S316, increments by one the contents of address counter 18, and further decrements the contents of counter (not shown) by one. At this time, if a carry relative to the offset occurs in address counter 18, transfer control counter 17 generates a page change interrupt to CPU 11. In this way, the data is transferred word by word through repetition of the above steps. When the data transfer is completed, DMA controller 25 generates a transfer completion interrupt. While the above data transfer is being executed, CPU 11 repeatedly executes steps S34 to S38.

In step S34, CPU 11 detects whether or not the transfer completion interrupt from DMA controller 25 occurs. If the interrupt is present, CPU 11 determines that the data transfer has been completed. If the transfer operation is not yet completed, step S36 is executed.

In step S36, CPU 11 checks whether or not the page change interrupt from address counter 18 is generated. If the page change interrupt is not present, step S32 is executed again. If the page change interrupt is detected, CPU 11 executes step S38. In step S38, it is checked if the not yet written real page address data is left in RAM 12. If Y in step S36, CPU 11 executes to step S14, to write it to DAT-RAM 19. Therefore, if the page change interrupt is generated and the not yet written data is left in RAM 12, CPU 11 can write into DAT-RAM 19 the real page address as obtained during the seek operation where CPU 11 is placed in the idle mode in the prior apparatus.

At this time, since the transfer starting command has been output from CPU 11, step S34 is immediately executed if Y in step S18.

Then, it is checked if the memory area accessed by the next real page address is continuous to the memory area accessed just before on the main memory. If these are continuous, the above operation is continuously performed. If not continuous, new offset is set in the transfer control counter 17. Therefore, the data transfer operation is stopped.

In the above description, all the virtual page address data corresponding to the first CCW is translated in step S12. However, these except for the leading virtual page address data may be translated in step S24, together with remaining CCWs.

In this way, the data transfer is performed, and hence when CCWs in channel program accesses the real memory area over continuous memory area, the channel apparatus of this invention can transfer data at a higher speed than the prior apparatus.

Another operation of the embodiment arranged shown in FIG. 1 will be described referring to FIGS. 7A and 7B. The operations of most of the steps shown in FIGS. 7A and 7B are similar to those of the steps shown in FIGS. 6A and 6B. Therefore, the steps with the same operations will be described simply.

The steps S110 and S112 have the operations similar to those of steps S10 and S12. In those steps, the channel program is read out from main memory 30, and stored into RAM 12. The virtual address written in a first CCW in the channel program is translated into the real page address, and written into RAM 12.

When the address translation of the first CCW is completed in step S113, CPU 11 generates a seek command to controller 55 on the basis of the first CCW.

Subsequently, step S114 is executed to write the first real page address data into DAT-RAM 19. In step S116, the written real page address is read out to check if the write operation is correctly performed or not. If N in step S116, step S110 is executed and the read-out of the channel program is performed again. If Y in step S116, step S118 is executed to check if the write operation is completed or not. If N in step S118, step S126 is executed, and if Y, step S122 is executed.

In step S122, the address translation of other CCW than the leading CCW in the channel program is performed. Subsequently, step S114 is executed and the real page address are written collectively to the remaining area of DAT-RAM 19. Subsequently, in step S116, the additionally written real page addresses are read out sequentially, to check if these have correctly been written. Then, step S118 is executed again. This time, since step S118 is N, step S126 is executed.

In step S126, if the transfer starting command is not given, step S128 is executed. If it is given, step S134 is executed.

In step S128, CPU 11 checks if the seek completion interrupt is present or not. If it is present, step S130 is executed. The operations of step S130 to S136 are similar to those of steps S30 to S36.

In step S136, if the page change interrupt as given from transfer control counter 17 is present, step S138 is executed. In step S138, it is determined if the number of page change interrupts is below a predetermined value. If N in step S138, step S142 is executed. If Y, step S134 is executed. The operation of step S142 is the same as that of step S38.

All the virtual page address data corresponding to the first CCW except for the leading virtual page address data, together with remaining CCWs, may be translated in step S133, instead of step S112.

In this way, the channel program can continuously be executed when the real memory areas for CCWs in the channel program are continuous even if the page is changed, resulting in the improvement of the throughput.

Another embodiment of a channel apparatus according to this invention will be given.

Figure 9:
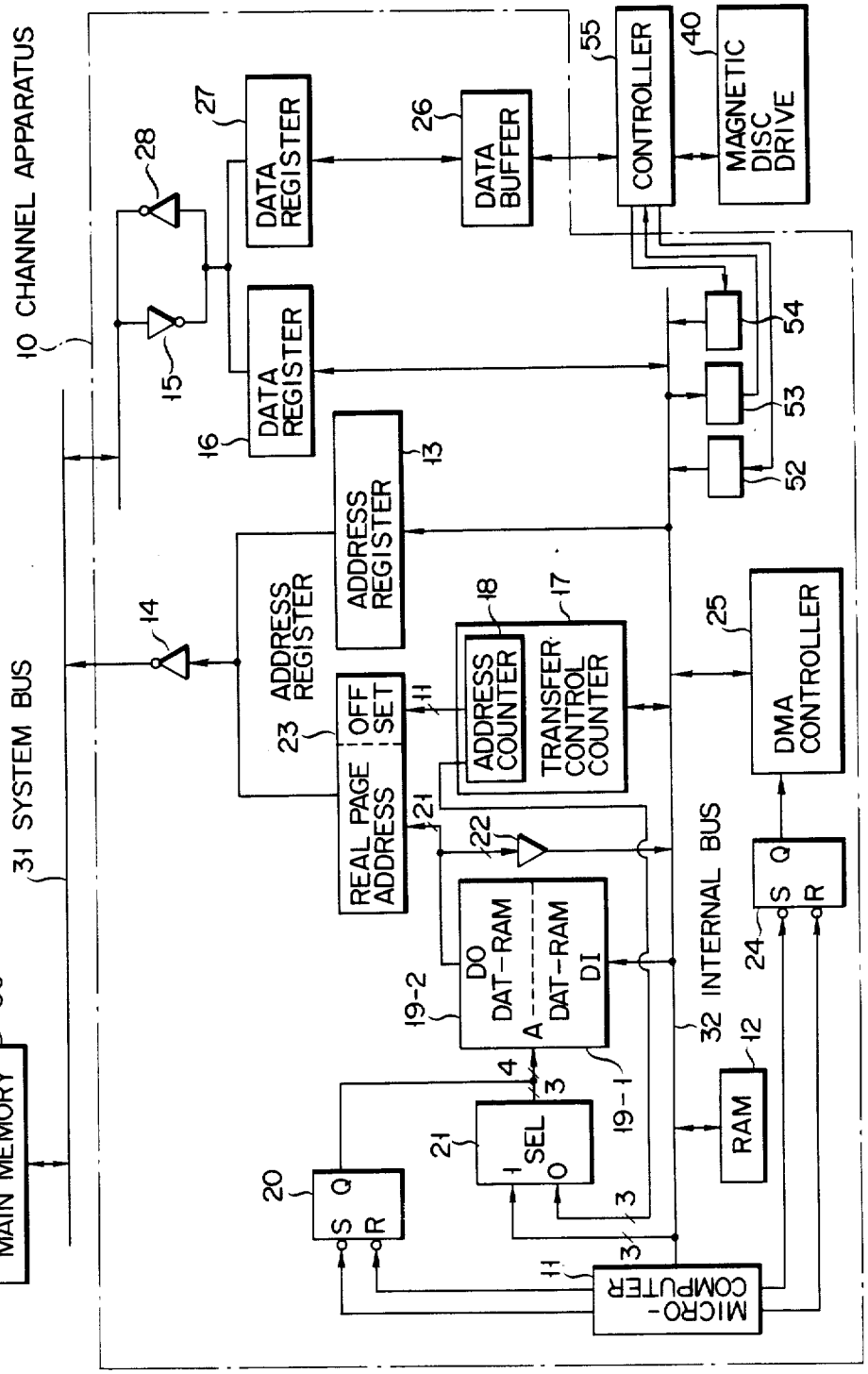
FIG. 9 is a block diagram showing an arrangement of another embodiment of a channel apparatus according to this invention.

This embodiment is arranged as shown in FIG. 9. The arrangement of this embodiment is almost the same as that of the embodiment shown in FIG. 1. The point that differs between those embodiments is that two DAT-RAMs 19-1 and 19-2 and a flip-flop (select F/F) 20 are provided. Select F/F 20 is for selecting either DAT-RAM 19-1 or 19-2. These two DAT-RAMs have the same size memory areas capable of storing a maximum of 8 real page addresses, for example. Select F/F 20 switches the output state by a command from CPU 11. The output of select F/F 20, together with the output from selector 21, is output as a DAT-RAM address to DAT-RAM. In other words, the output of select F/F 20 is used to designate the DAT-RAM to be selected. The output of selector 21 is the same as that in the embodiment shown in FIG. 1.

The operation of this embodiment will be described. The operation is almost the same as that of FIGS. 6A and 6B. The step that differs is step S16 of FIG. 6A.

Figure 10:
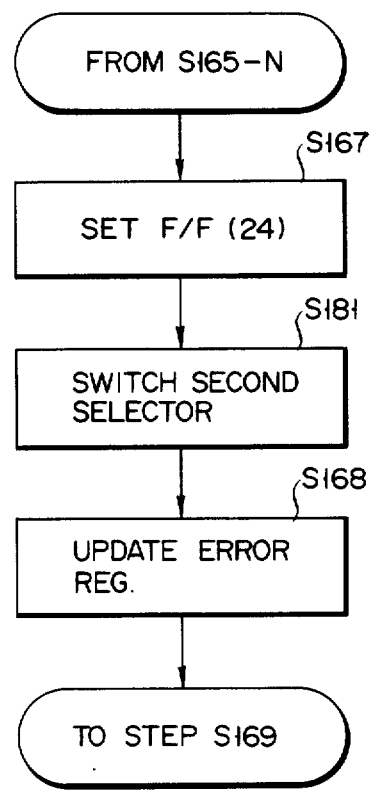
FIGS. 10 and 11 show flowcharts illustrating an error processing flow in the embodiment shown in FIG. 9.

The details of step S16 are shown in FIG. 8. In step S165, when the written real page addresses are not the same as the read out real page addresses, step S167 is executed. In step S167, transfer permission F/F 24 is reset. After that, in this embodiment, unlike the case of the embodiment shown in FIG. 1, step S181 is executed, as shown in FIG. 10, In step S181, in order to rewrite the real page addresses, CPU 11 outputs to F/F 20 a command to use the DAT-RAM currently not used. Then, step S168 is executed.

Figure 11:
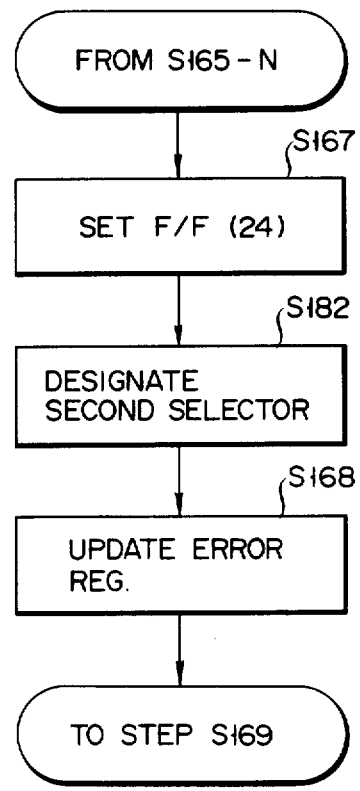

Another operation of the channel apparatus is shown in FIG. 11. In this embodiment, instead of step S181, step S182 is executed. In this step, CPU 11 generates a command to always designate second DAT-RAM 19-2. In step S168, the error register is updated.

As shown in FIGS. 10 and 11, when the write operation of the real page address has not been done correctly, DAT=RAM 19-2 is put into use. As regards faults in the DAT-RAM, this embodiment is reinforced, in other words, it has redundancy in function.

Figure 12:
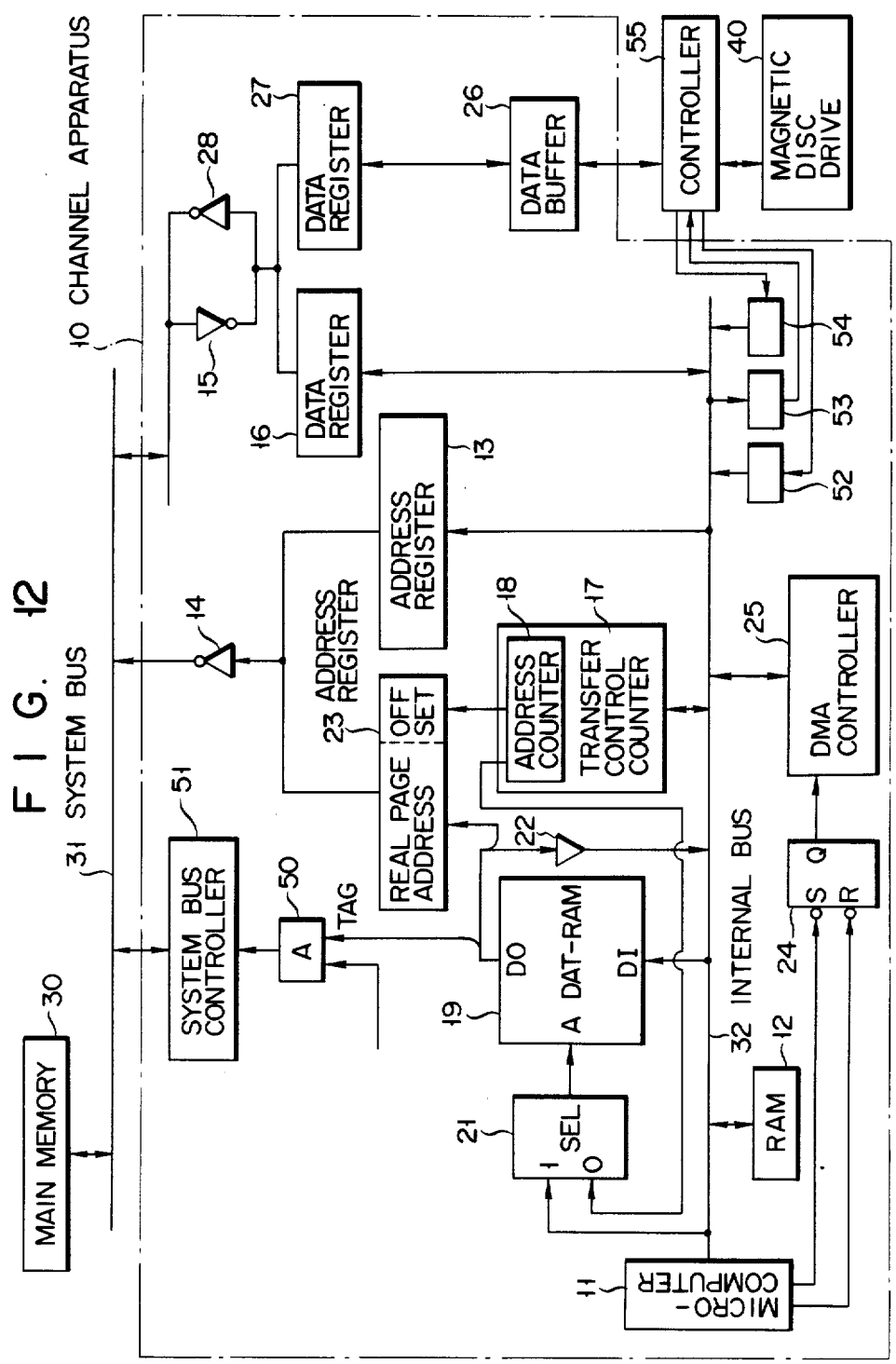
FIG. 12 is a block diagram showing the arrangement of another embodiment of the channel apparatus according to this invention.

Another embodiment of the channel apparatus according to this invention will be described referring to FIG. 12. The basic arrangement is the same as that of the embodiment shown in FIG. 1. Therefore, different points of this embodiment from the embodiment shown in FIG. 1 will be described. The DAT-RAM 59 has a memory area capable of storing a maximum of 8 real page addresses, like DAT-RAM 19 in FIG. 1, but in this embodiment, real page addresses can be stored into each area of DAT-RAM 59 with tag information. Real page addresses with tag information can also be stored into RAM 12.

In the embodiment, tag information is 1-bit data, and is attached to the translated real page addresses. For example, when a skip operation has been commanded in the flag field of a CCW, the tag is "1". When the skip operation has not been commanded, the tag is "0". When data transfer is being performed, this tag information is output to AND gate 50 in response to the memory request command. The memory request command from DMA controller 25 is output to the other input terminal of AND gate 50. Gate 50 performs a logical AND of these two inputs, and outputs the result of the logical AND to system bus controller 51. Bus controller 51, in accordance with this input, controls an access control to main memory 30, and performs the control of write-in and read-out operations.

Next, the operation of this embodiment will be described. This operation is basically the same as the operation shown in FIGS. 6A and 6B. Therefore, the operation of this embodiment will be described with reference to FIGS. 6A and 6B.

It is assumed now that that the data transfer command is generated by the main CPU (not shown). In that case, CPU 11, as shown in step S10, responsive to the data transfer command, starts the operation to read out a channel program from the main memory 30 and to store into RAM 12 the channel program including a CCW group as shown in FIG. 4.

In a CCW of the CCW group included in the channel program, there are cases when a skip operation will be commanded during the data transfer between the main memory and an input/output device, such as magnetic disc device 40. It is assumed that the channel program, as shown in FIG. 4, is composed of a first CCw for designating the transfer of a first amount of data, a second CCW for skipping by the second data amount, a third CCW for designating the transfer of a third amount of data in the memory area following to the memory area accessed by the second CCW.

In step S12, CPU 11 executes the address translation of the leading virtual page address in the first CCW, and prepares for data transfer.

The read out CCW has the data format as shown in FIG. 2, for example. The CCW is composed of a 16-bit count field, an 8-bit flag field, an 8-bit command field, and a 32-bit address data field. The command field is used for designating the operations, such as seek, read and write. The flag field is used for specifying the command chain, data chain, or skip chain. The address data field is used for indicating the leading virtual address to execute the command specified by the command field. The count field is used to indicate the data size to be subject to the command. The address data field is composed of a 21-bit virtual page address field, and an 11-bit offset field, as shown in FIG. 3.

Figure 14:
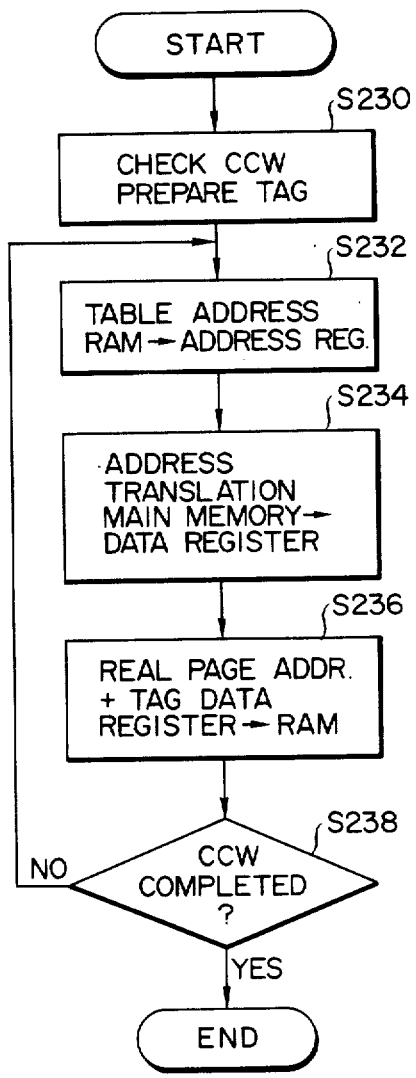

The details of the address translation operation of this embodiment are shown in FIG. 14. In step S230, CPU 11 checks the flag field of the CCW to be translated. If a skip flag is set, tag bit "1" is used. If it is not set, tag bit "0" is used.

In step S232, corresponding to the virtual page address of the first CCW, CPU 11 sets in address register 13 the address data for accessing to the translation table of main memory 30. The address data is output from address register 13, via driver 14, to main memory 30. In step S234, main memory 30 outputs the translated real page address data to data register 16. Then, in step S236, CPU 11 receives the translated real page address data from data register 16, and stores it, together with the already prepared tag bit, into RAM 12. In step S238, it is determined if CCW is a command concerning data transfer of less than one page. If N in step S238, step S232 is executed again.

CPU 11 takes out a given field, or the lower 11-bit part corresponding to the offset data in the address data field shown in FIG. 3, from the address data field of the first CCW. Then, CPU 11 sets the lower 11-bit part, together with data to set the upper 3-bit part to "0", in address counter 18 of transfer control counter 17. Further, CPU 11 sets the total count of the data size specified by the count field of each CCW to be continuously executed in the CCW group read into RAM 12, in the size counter of transfer control counter 17.

CPU 11 resets the internal area of RAM 12 where various kinds of data necessary for the transfer operation, such as the number of real page addresses read into DAT-RAM 59 or the number of error determinations.

In step S14, the leading real page address with tag information is written into DAT-RAM 59. At this time, the number of write operations is incremented by 1. Since the number of write operations was reset in step S12, the number is now 1.

In step S16, it is determined if the write operation of the real page address data to DAT-RAM 59 was done normally or not. If Y, step S18 is executed; if N, step S10 is executed.

In step S18, it is determined if a transfer starting command is given. If not, step S20 is executed, and it is determined if the number of the write operation of real page addresses into DAT-RAM 19 is 1 or not. The number of write operations is now 1, and so step S22 is executed. In step S22, a seek command corresponding to the first CCW, is generated via port 53 to controller 55 by CPU 11. In response to this command, magnetic disc drive 40 starts a seek operation.

As stated above, while magnetic disc drive 40 is executing the seek operation, in step S24, CPU 11 repeatedly executes the address translation of all CCWs in the channel program except the first CCW already translated in step S12. The address translation for each CCW is the same as the operation explained in step S12.

Then, in order to write the translated real page addresses into DAT-RAM 19, steps S14 through S18 are executed. The second real page address is written into DAT-RAM 19. Subsequently, in writing the real page address, the DAT-RAM addresses are incremented by 1. The number of write operations is incremented by 1.

Subsequently, step S20 is executed, but since the number of write operations is not 1, the answer is N, and step S26 is executed. CPU 11 determines if a given number of times the write operation of real page addresses is completed or not. If Y, step S28 is executed. When DAT-RAM 19 is not full, and not yet written real page addresses remain in the RAM 12, steps S14 through S20 are executed in order to perform again the write operation of the real page address. DAT-RAM 19 has the memory area for storing a maximum of 8 real page addresses. Therefore, if there are more than 8 real page addresses, the above steps must be repeated.

Figure 6B:
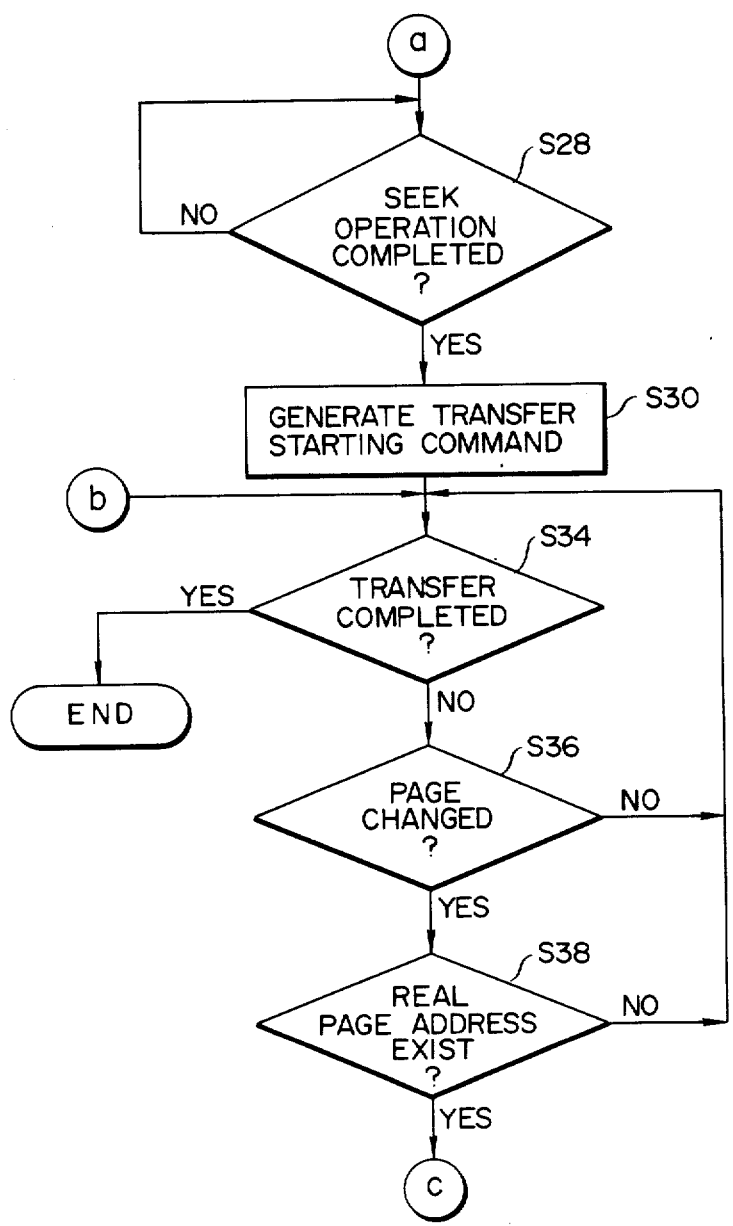
Figure 7A:
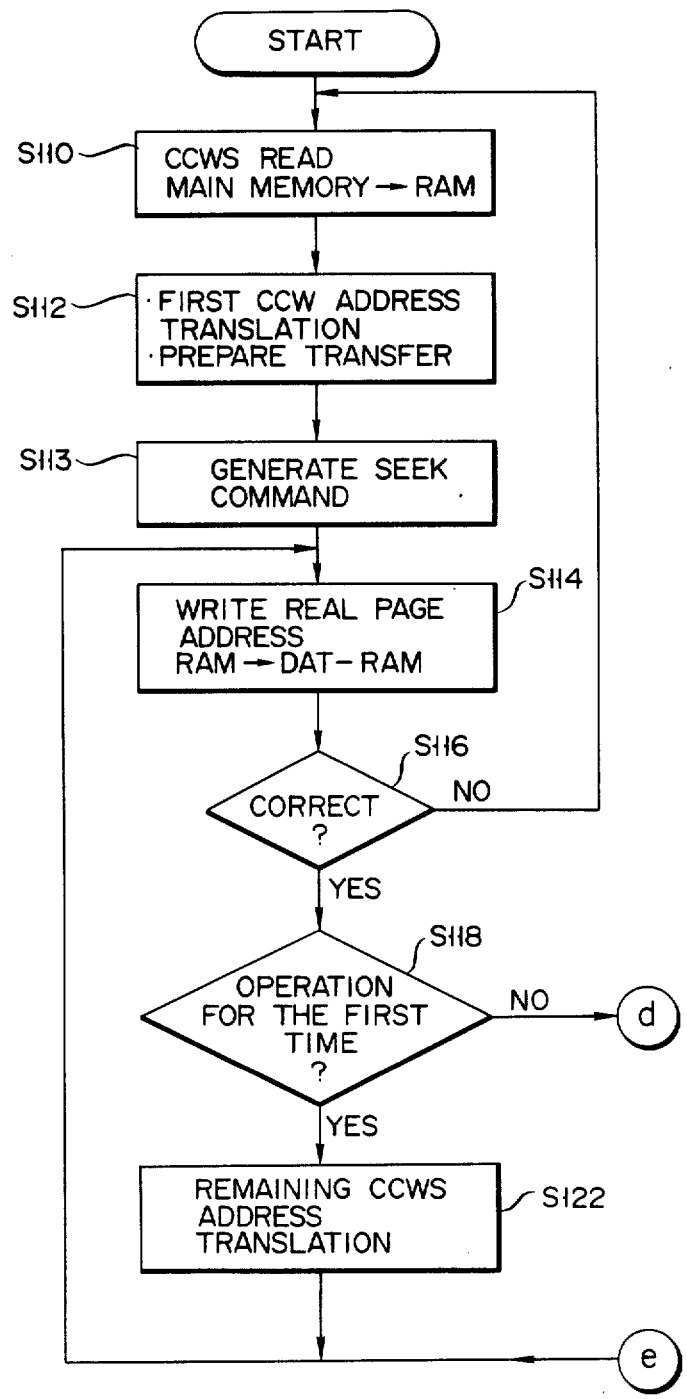
FIGS. 7A and 7B show another flowchart explaining the operation of the embodiment in FIG. 1.
Figure 7B:
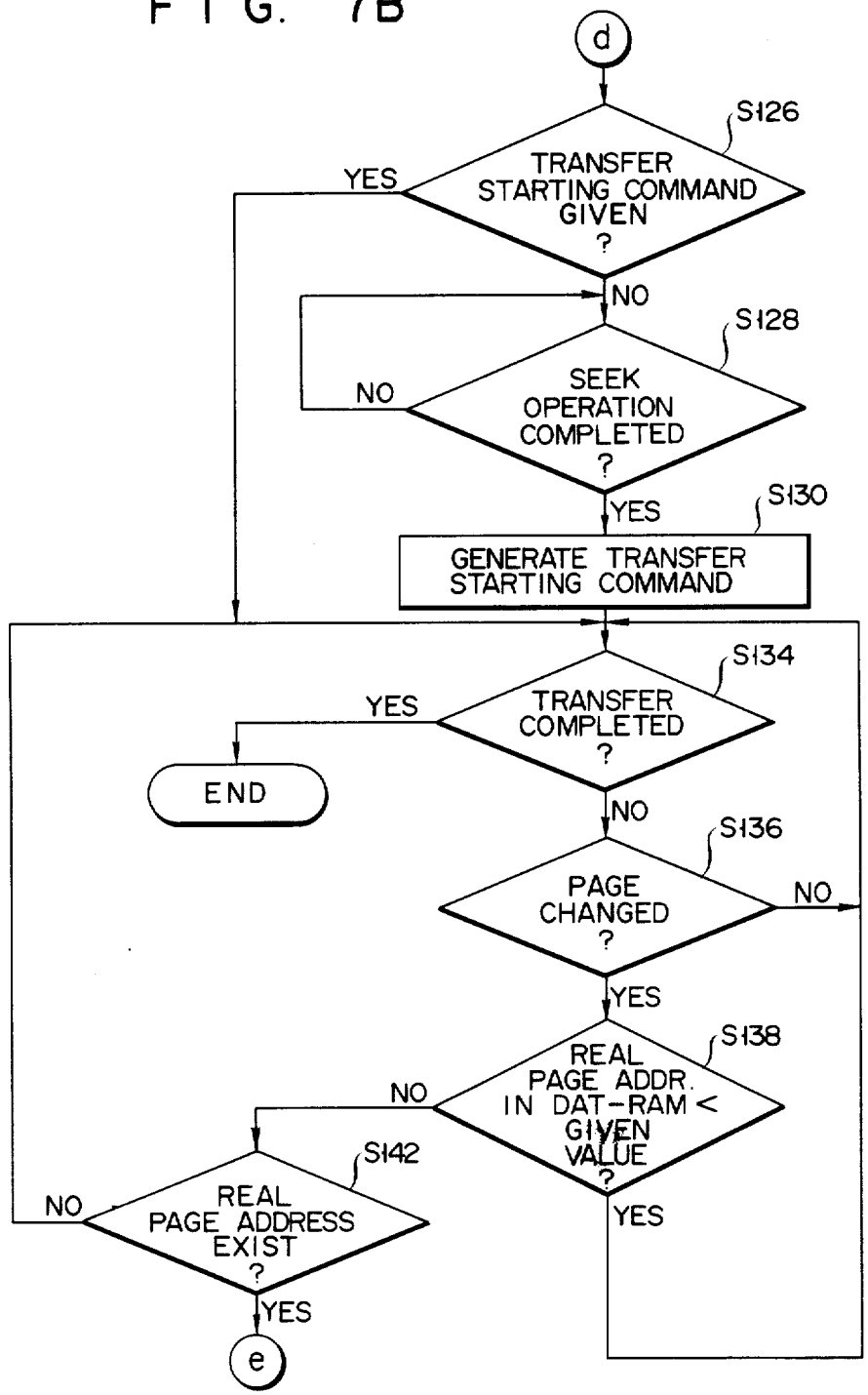
Figure 16:
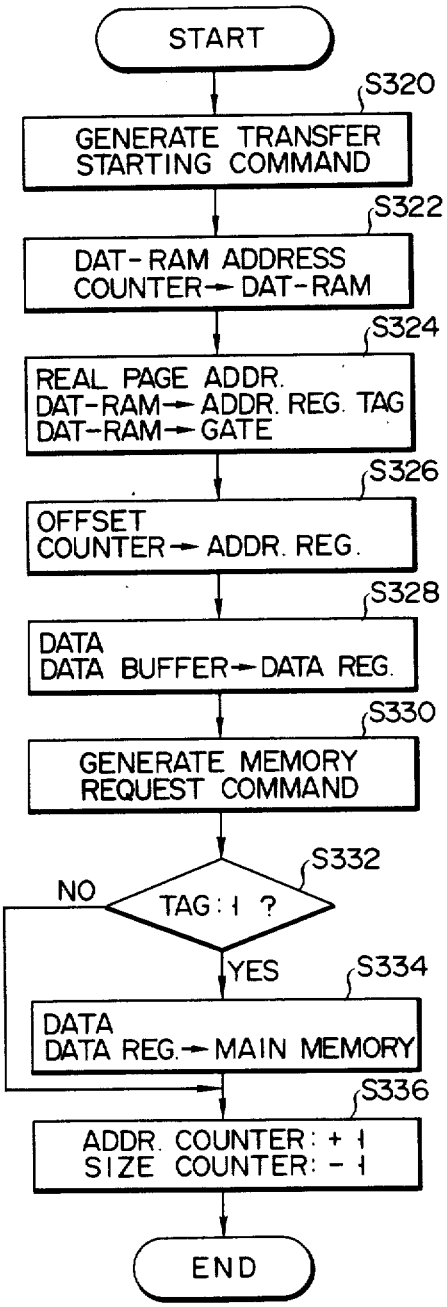

Following the real page address write operation, in step S28 of FIG. 6B, CPU 11 determines if the seek operation of magnetic disc drive 40 is completed or not. This is determined by waiting for the seek completion interrupt from controller 55. When CPU 11 determines that the seek operation is completed, step S30 of FIG. 6B is executed, a transfer starting command is generated, and the data transfer operation is begun. The generation of the transfer starting command and the data transfer operation in this embodiment will be described with reference to FIG. 16.

In step S320, CPU 11 generates the transfer starting command, and at the same time, prepares for data transfer. An access command to magnetic disc drive 40 is included in these preparations. More specifically, CPU 11 outputs a selector control command, and enables the input terminal of the "0" side, i.e. the transfer control counter 17 side in selector 21. Then CPU 11 permits the latch operation of address register 23, and disables gate 22. After that, CPU 11 outputs the transfer starting command. In response to the access command, controller 55 accesses magnetic disc drive 40. Drive 40 starts to read data, and the read data is transferred to data buffer 26. Transfer permission F/F 24, in response to the transfer starting command, is set, and DMA controller 25, in response to the output of transfer permission F/F 24, begins the control of DMA data transfer between main memory device 30 and data buffer 26 in channel apparatus 10.

DMA controller 25 starts the read operation for data buffer 26 when data stored into data buffer 26 exceeds a predetermined size. At this time, transfer control counter 17 outputs the contents of address counter 18, in accordance with the memory request command by DMA controller 25. As shown in step S322, the upper 3-bit part of those contents are output to DAT-RAM 19, via selector 21. In step S324, the real page address with tag information at the DAT-RAM address specified by address counter 18, is output to address register 23. In step S326, the lower 11-bit part from counter 18 are output to address register 23, as offset. As a result, the real address for main memory 30 is set in address register 23.

The data, which is read out from magnetic disc drive 40 and stored in data buffer 26, is read out by DMA controller 25, and latched into data register 27 in step S328. In step S330, these real addresses and data, in response to the memory request command from DMA controller 25, are output to main memory 30. However, the tag bit of the real page address data output from DAT-RAM 19 is checked in step S332. As a result, if the tag bit is "0", the memory request command is inhibited by AND gate 50, and even if the real address and data are output, data cannot be written into main memory 30. If the tag bit is "1", step S334 is executed, and as stated before, in step S314, data is written into main memory 30. In this manner, one word of data has been transferred to main memory 30.

In step S336, DMA controller 25 increments the contents of address counter 18 by 1, and decrements the contents of the size counter (not shown) by 1.

In step S34 of FIG. 6B, it is determined if the DMA data transfer operation is completed or not. Then, CPU 11 detects the presence or absence of a transfer completion interrupt from DMA controller 25, and determines that the transfer process is completed. If the transfer is not completed, step S36 is executed.

In step S36, CPU 11, by means of a carry from address counter 18, detects the page change interrupt from transfer control counter 17, and determines if a page change has been occurred or not. If the page change interrupt has not been generated, the flow returns to step S34 to transfer the next word data. If the page change interrupt is detected, the upper 3-bit part of address counter 18, or DAT-RAM address is incremented by 1 in step S36.

In step S38, it is determined if the not yet written real page address remains in RAM 12. If Y, the flow returns to step S24, in order to execute the write operation to DAT-RAM 19. With return to this step, if the page change interrupt is generated and the not yet written real page address still remains in RAM 12, the real page address data written in RAM 12 during the seek operation in idle state on the prior start, can be written to DAT-RAM 19.

At this time, since the transfer starting command has been output from CPU 11, the answer in step S18 is determined to be Y, and the transfer operation of step S32 is immediately executed.

All the virtual page address corresponding to the first CCW except for the leading virtual page address data, together with remaining CCWs, may be translated in step S24 instead of step S12.

While the channel apparatus according to this invention has been described using the data transfer in reading in from an external memory device, the channel apparatus is also operable similarly for the data transfer in writing data into the memory transfer.

It should be understood that the present invention, which has been described based on the virtual page address, is applicable for the virtual address system, such as virtual segment address system.

What is claimed is:

1. A channel apparatus for effectively performing a DMA transfer of input data to an external memory, comprising:

DMA transfer means for holding an input initial value of a DMA address including offset data and a read storage address, said DMA transfer means comprising:
  means for performing the DMA transfer of the input data to the external memory in a read mode in accordance with an input transfer start instruction while the input data is being input from an external device,
  means for generating a memory request to output the generated request with the held DMA address every time a DMA transfer of a word of the input data is performed, and
  means for incrementing said held DMA address by one every time an output is made to said held DMA address;

real address storage means for receiving designated real block address (RBA) data and a write storage address to store the designated RBA data at said write storage address in a write mode, comprising:
  means for receiving said DMA address from said DMA transfer means in said read mode, and
  means for outputting to the external memory a real address produced in combination with the offset data in said received DMA address and the stored RBA data at said read storage address in said received DMA address in response to said memory request; and transfer control means responsive to an input data transfer command, for translating virtual block address data designated by a channel command word (CCW) into RBA data, to store the translated RBA data, comprising:
  means responsive to the CCW for commanding the DMA transfer of the input data over a plurality of subsequent blocks of said external memory,
  means for setting said real address storage means in the write mode,
  means for designating a predetermined number of the translated RBA data to sequentially output the designated RBA data with the write storage address to said real address storage means in the write mode,
  means for incrementing the write storage address by one each time the write storage address is output,
  means for outputting the initial value of the DMA address to said DMA transfer means, and means for setting said real address storage means in the read mode to output the transfer start instruction to said DMA transfer means in the read mode.

2. The apparatus according to claim 1, wherein said real address storage means comprises:
   address select means for selecting the write storage address from said transfer control means in the write mode and the read storage address from said DMA transfer means in the read mode;
   storage means for receiving the designated RBA data from said transfer control means and the selected storage address from said address select means, to store the designated RBA data at the selected storage address in the write mode, and for outputting the stored RBA data at the selected storage address in the read mode; and
   real address producing means for receiving the offset data in the DMA address from said DMA transfer means and the stored RBA data from said storage means, for producing the real address in combination with the received RBA data and the received offset data, for outputting the produced real address to said external memory in response to the memory request.

3. The apparatus according to claim 1, wherein said transfer control means comprises:
   address translation means responsive to an input translation instruction, for translating the designated virtual block address data into the RBA data to store the translated RBA data;
   real address write means for holding an input value, for reading out the designated RBA data from said address translation means in response to an input write instruction, to output to said real address storage means the read out data and the held value as the write storage address in the write mode, and for incrementing the held value by one after outputting the held value; and
   control means responsive to the input data transfer command, for designating the virtual block address data to output the translation instruction to said address translation means, said control means comprising:
   means for outputting the value to said real address write means,
   means for setting said real address storage means in the write mode,
   means for designating the predetermined number of the translated RBA data to output the write instruction to said real address write means in the write mode,
   means for outputting the initial value of the DMA address to said DMA transfer means, and
   means for setting said real address storage means in the read mode to output the transfer start instruction to said DMA transfer means in the read mode.

4. The apparatus according to claim 3, wherein said external device is a disk drive unit, and wherein said control means includes means for generating and outputting to said external device a seek instruction after a first one of the predetermined number of designated RBA data is written in said real address storage means, and for generating and outputting to said external device a read instruction to cause said external device to read out data to said DMA transfer means after the predetermined number of the designated RBA data are written in said real address storage means.

5. The apparatus according to claim 3, wherein said external device is a disk drive unit, and wherein said control means includes means for generating and outputting to said external device a seek instruction after a first one of all the designated virtual block address data is translated, and for generating and outputting to said external device a read instruction to cause said external device to read out the data to said DMA transfer means after the predetermined number of the designated RBA data are written in said real address storage means.

6. The apparatus according to claim 3, wherein said DMA transfer means includes means for generating a block change interrupt when the offset data in the incremented DMA address becomes equal to a size of each block, and wherein said control means includes:
   means for checking in accordance with the block change interrupt if not-yet-written (NYW) RBA data exists in said translation means,
   means for setting said real address storage means in the write mode when the NYW RBA data exists,
   means for designating a first one of the NYW RBA data to output the write instruction to said real address write means, and
   means for setting said real address storage means in the read mode after the first NYW RBA data is written.

7. The apparatus according to claim 3, wherein said real address storage means includes means for outputting the stored RBA data at the input read storage address to said control means in the read mode, said real address write means comprising:
   means for outputting the held value to said real address storage means as the read storage address in the read mode in accordance with an input check instruction; and
   checking means for setting said real address storage means in the read mode before the held value is incremented by said real address write means, to output the check instruction to said real address write means, for receiving the RBA data from said real address storage means to check using the received RBA data if the designated RBA data is correctly written in said real address storage means, and for setting said real address storage means in the read mode when it is determined that the designated RBA data is correctly written.

8. The apparatus according to claim 7, wherein said control means includes means for setting said real address storage means in the write mode to output the write instruction to said real address write means before the held value is incremented, when it is determined that the designated RBA data is not correctly written.

9. The apparatus according to claim 7, wherein said real address storage means includes first storage means for storing the designated RBA data, second storage means for storing the designated RBA data, and select means for selecting said second storage means in accordance with an input select control instruction, and said control means outputs the select control instruction to said select means when it is determined by said checking means that the designated RBA data is not correctly written.

10. A method of effectively performing a DMA transfer of data to an external memory, comprising:
    translating each virtual block address data of a plurality of channel command words (CCWs) into real block address (RBA) data in response to a data transfer command to hold the translated RBA data;

latching an initial value of a DMA address including an offset data and a read storage address;

sequentially writing a predetermined number of the held RBA data in a dynamic address translation RAM (DAT-RAM) in a write mode;

performing the DMA transfer of the data to the external memory in accordance with a transfer start instruction in a read mode while the data is being input from an external device, the DMA address and a memory request being output each time the DMA transfer of one word of the data is performed, and the DMA address being incremented by one each time the DMA transfer of the one word is performed; and combining the RBA data read out from the DAT-RAM in accordance with the read storage address in the DMA address and the offset data in the DMA address to output the combined data to the external memory in accordance with the memory request.

11. The method according to claim 10, wherein the external device is a disk drive unit, and further comprising the step of generating a seek instruction to the external device after the first RBA data is stored in the DAT-RAM.

12. The method according to claim 10, wherein the external device is a disk drive unit, and further comprising the step of generating a seek instruction to the external device after a first virtual block address data is translated.

13. The method according to claim 10, wherein said step of performing the DMA transfer includes the step of generating a block change interrupt when the offset data of the incremented DMA address becomes equal to a size of each block of the external memory, and said step of sequentially writing the RBA data further comprises the step of writing a first one of not-yet-written (NYW) RBA data in the DAT-RAM in the read mode in accordance with the block change interrupt.

14. The method according to claim 10, wherein said step of performing the DMA transfer includes generating a block change interrupt when the offset data of the incremented DMA address becomes equal to a size of each block of the external memory, and said step of sequentially writing the RBA data includes the step of writing a second predetermined number of the NYW RBA data in the DAT-RAM in the write mode, when the second predetermined number of the block change interrupts are generated.

15. The method according to claim 10, further comprising the steps of:

checking if each CCW includes a skip command; and adding tag data to each translated RBA data in accordance with the checked result, and wherein said step of performing the DMA transfer includes selectively outputting the memory request to the external memory in accordance with the tag data.

16. The method according to claim 15, further comprising the steps of:

reading the written RBA data from the DAT-RAM;

comparing the written RBA data with the read out RBA data to check if a coincidence between these data exists; and writing the read out RBA data in the DAT-RAM again, when it is determined that the RBA data is not correctly written.

17. The method according to claim 16, wherein said step of checking further comprises the steps of:

counting the number of noncoincidence times based on a result of said step of comparing; and determining that the DAT-RAM is faulty, when the number of the noncoincidence times is a given number, and wherein said step of writing includes writing the RBA data in another DAT-RAM.

18. A channel apparatus for effectively performing a DMA transfer of input data to an external memory, comprising:

DMA transfer means for holding an input initial value of a DMA address including offset data and a read storage address, said DMA transfer means comprising:

means for performing the DMA transfer of the input data to said external memory in a read mode in accordance with an input transfer start instruction while the input data is being input from an external device, means for generating a memory request, means for outputting the generated request and the DMA address, each time the DMA transfer of one word of the data is performed, and means for incrementing the DMA address by one for each time the DMA address is output;

real address storage means for receiving designated real block address (RBA) data with tag data and a write storage address to store the designated RBA data with the tag data at the received write storage address in a write mode, said real address storage means comprising:

means for receiving the DMA address from said DMA transfer means in the read mode, means for outputting the tag data attached to the stored RBA data at the read storage address of the received DMA address, and means for producing a real address in combination with the offset data in the received DMA address and the stored RBA data at the read storage address of the received DMA address to output the real address to said external memory in response to the memory request;

memory request output means for receiving the tag data from said real address storage means, and for selectively outputting the memory request from said DMA transfer means to said external memory in accordance with the received tag data; and transfer control means responsive to an input data transfer command, for reading a channel program comprising a plurality of channel command words (CCWs), at least one of the plurality of CCWs commanding a skip operation, for checking if each of the CCWs commands the skip operation, said transfer control means comprising:

means for preparing the tag data in accordance with the checked result, means for translating each virtual block address data designated by the each CCW into RBA data to store the translated RBA data with the prepared tag data, means for setting said real address storage means in the write mode, means for designating a predetermined number of the translated RBA data with the tag data to output the designated data with the write storage address to said real address storage means in the write mode, the write storage address being incremented by one each time the write storage address is output;

means for outputting the initial value of the DMA address to said DMA transfer means; and means for setting said real address storage means in the read mode to output the transfer start instruction to said DMA transfer means in the read mode.

19. The apparatus according to claim 18, wherein said real address storage means further comprises:

address select means for selecting the write storage address from said transfer control means in the write mode and the read storage address from said DMA transfer means in the read mode;

storage means for receiving the designated RBA data with the tag data from said transfer control means and the selected storage address from said address select means to store the designated RBA data at the selected storage address in the write mode, and for outputting the stored RBA data with the tag data at the selected storage address in the read mode; and real address producing means for receiving the offset data in the DMA address from said DMA transfer means and the stored RBA data from said storage means, said real address producing means comprising:

means for producing the real address in combination with the received RBA data and the received offset data, and means for outputting the produced real address to said external memory in response to the memory request.

20. The apparatus according to claim 18, wherein said transfer control means further comprises:

address translation means responsive to an input translation instruction, for translating the designated virtual block address data into the RBA data to store the translated RBA data;

real address write means for holding an input value, said real address write means comprising:

means for reading out the designated RBA data from said address translation means in response to an input write instruction to output the read out data to said real address storage means with the input tag data and the held value as the write storage address in the write mode, and means for incrementing the held value by one after outputting the held value; and control means responsive to the input data transfer command, for reading the channel program, said control means comprising:

means for checking if the CCW commands the skip operation, means for preparing the tag data in accordance with the checked result, means for designating the virtual block address data to output the translation instruction to said address translation means, means for outputting the value to said real address write means, means for setting said real address storage means in the write mode, means for designating the predetermined number of the translated RBA data to output the write instruction and the tag data prepared for each translated RBA data to said real address write means in the write mode, means for outputting the intitial value of the DMA address to said DMA transfer means, and means for setting said real address storage means in the read mode to output the transfer start instruction to said DMA transfer means in the read mode.

21. The apparatus according to claim 20, wherein said external device is a disk drive unit, and wherein said control means includes means for generating and outputting to said external device a seek instruction after a first one of the predetermined number of designated RBA data with the tag data are written in said real address storage means, and for generating and outputting to said external device a read instruction to cause said external device to read out the data to said DMA transfer means after the predetermined number of the designated RBA data with the tag data are written in said real address storage means.

22. The apparatus according to claim 20, wherein said external device is a disk drive unit, and said control means further comprises means for generating and outputting to said external device a seek instruction after a first one of all the designated virtual block address data is translated, and for generating and outputting to said external device a read instruction to cause said external device to read out the data to said DMA transfer means after the predetermined number of the designated RBA data with the tag data are written in said real address storage means.

23. The apparatus according to claim 20, wherein said DMA transfer means includes means for generating a block change interrupt when the offset data in the incremented DMA address becomes equal to a size of each block, and wherein said control means includes:

means for checking in accordance with the block change interrupt if not-yet-written (NYW) RBA data with the tag data exists in said translation means, means for setting said real address storage means in the write mode when the NYW RBA data with the tag data exists, means for designating a first one of the NYW RBA data with the tag data to output the write instruction to said real address write means, and means for setting said real address storage means in the read mode after the first NYW RBA data with the tag data is written.

24. The apparatus according to claim 20, wherein said real address storage means includes means for outputting the stored RBA data with the tag data at the input read storage address to said control means in the read mode, wherein said real address write means includes means for outputting the held value to said real address storage means as the read storage address in the read mode in accordance with an input check instruction, and wherein said control means includes:

checking means for setting said real address storage means in the read mode before the held value is incremented by said real address write means, to output the check instruction to said real address write means;

means for receiving the RBA data with the tag data from said real address storage means to check using the received RBA data with the tag data if the designated RBA data is correctly written in said real address storage means; and means for setting said real address storage means in the read mode when it is determined that the designated RBA data with the tag data is correctly written.

25. The apparatus according to claim 24, wherein said control means includes means for setting said real address storage means in the write mode to output the write instruction to said real address write means before the held value is incremented, when it is determined that the designated RBA data with the tag data is not correctly written.

26. The apparatus according to claim 24, wherein said real address storage means includes:

first storage means for storing the designated RBA data with the tag data;

second storage means for storing the designated RBA data with the tag data; and select means for selecting said second storage means in accordance with an input select control instruction, and said control means for outputting the select control instruction to said select means when it is determined by said checking means that the designated RBA data with the tag data is not correctly written.

* * * * *